US007705873B2

(12) United States Patent
Kuse

(10) Patent No.: US 7,705,873 B2
(45) Date of Patent: Apr. 27, 2010

(54) IMAGE FORMING APPARATUS AND MULTI-FUNCTION DEVICE

(75) Inventor: Kazutoshi Kuse, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 151 days.

(21) Appl. No.: 11/736,860

(22) Filed: Apr. 18, 2007

(65) Prior Publication Data

US 2007/0243748 A1 Oct. 18, 2007

(30) Foreign Application Priority Data

Apr. 18, 2006 (JP) ............................ 2006-114252

(51) Int. Cl.
*B41J 2/435* (2006.01)
*H01R 13/44* (2006.01)
*H01R 13/73* (2006.01)
*H02B 1/01* (2006.01)

(52) U.S. Cl. ........................ 347/263; 439/138; 439/544

(58) Field of Classification Search ................. 399/107; 361/684, 705; 710/303; 400/61, 76; 358/1.16; 439/10, 11, 67, 74, 135–139, 338, 341, 544; 347/245, 257, 263

See application file for complete search history.

(56) References Cited

U.S. PATENT DOCUMENTS 4,730,947 A * 3/1988 Ikeda et al. ................... 400/61
4,872,091 A * 10/1989 Maniwa et al. .............. 361/684
5,052,830 A * 10/1991 Gohara ......................... 400/76
5,337,220 A * 8/1994 Granitz ........................ 361/816
5,479,239 A * 12/1995 Ishida et al. ................ 399/107
5,592,595 A * 1/1997 Wakabayashi et al. ...... 358/1.16
5,737,541 A * 4/1998 Shimizu et al. ............. 710/303
6,004,142 A * 12/1999 Wark ........................... 439/74
6,025,993 A * 2/2000 Wakabayashi et al. ....... 361/705
6,371,770 B1 * 4/2002 Lai ............................. 439/67
6,510,057 B2 * 1/2003 Yap et al. ..................... 361/752
2003/0025674 A1 * 2/2003 Watanabe .................... 345/168
2005/0287852 A1 * 12/2005 Sugawara et al. ........... 439/135

FOREIGN PATENT DOCUMENTS

JP 2001357359 A * 12/2001
JP 2003077606 3/2003
JP 2003276276 9/2003

* cited by examiner

*Primary Examiner*—Hai C Pham
(74) *Attorney, Agent, or Firm*—Banner & Witcoff, Ltd

(57) ABSTRACT

An image forming apparatus, includes: an image forming unit that forms an image on a recording sheet; a casing that encloses the image forming unit and that has an ejection port configured to eject the recording sheet on which the image are formed; an ejection tray that stacks recording sheets ejected from the ejection port; a main frame side connector configured to electrically connect to an external device, the main frame side connector connectable to an external device side connector provided in the external device while at least a part of the external device is disposed outside the casing; and a supporting member that displaceably supports the main frame side connector with respect to the casing.

6 Claims, 17 Drawing Sheets

IMAGE FORMING APPARATUS AND MULTI-FUNCTION DEVICE

The entire disclosure of Japanese Patent Application No. 2006-114252 filed on Apr. 18, 2006, including specification, claims, drawings and abstract is incorporated herein by reference in its entirety.

BACKGROUND

1. Field

The present invention relates to an image forming apparatus, in particular to an image forming apparatus having connectors in its main frame, which enable electric connection to an external device.

2. Description of the Related Art

Conventionally, an image forming apparatus is provided with various connectors in its main frame in order to enable electric connection to an external device.

JP-A-2003-276276 discloses an image forming apparatus that is provided with a parallel connector and a USB connector to input data from an external device, and a power source connector to be connected to a power source, respectively.

Also, the image forming apparatus is generally provided with an ejection tray to stack ejected recording sheets having images formed on its surface.

However, when an external device is connected to the main frame side connector as described in JP-A-2003-276276, there may be cases where the external device or an external device side connector connecting the external device to the main frame side connector, etc., protrude outward of the casing of the image forming apparatus.

If a user drops, by mistake, a bundle of recording sheets taken out from the ejection tray, the bundle of recording sheets may be brought into collision with the protruded external device itself or the external device side connector. The collision force is transmitted to the main frame side connector, wherein there is a possibility for the main frame side connector to be subjected to damage.

In recent years, a USB memory in which an external device side connector attachable to such a main frame side connector is integrated has been used. When an impact is given to the USB memory with the USB memory connected to the main frame side connector, a force due to the impact is given directly to the main frame side connector. In such a case, a possibility for the main frame side connector to be subjected to damage becomes high.

SUMMARY

Therefore, an embodiment of the present invention provides an image forming apparatus and a multi-function device, which are capable of reducing the possibility for a main frame side connector used for electrical connections with an external device to be subjected to damage.

In a first aspect of the invention, an image forming apparatus includes: an image forming unit that forms an image on a recording sheet; a casing that encloses the image forming unit and that has an ejection port configured to eject the recording sheet on which the image are formed; an ejection tray that stacks recording sheets ejected from the ejection port; a main frame side connector configured to electrically connect to an external device, the main frame side connector connectable to an external device side connector provided in the external device while at least a part of the external device is disposed outside the casing; and a supporting member that displaceably supports the main frame side connector with respect to the casing.

BRIEF DESCRIPTION OF THE DRAWINGS

The embodiment may be described in detail with reference to the accompanying drawings, in which.

DETAILED DESCRIPTION

Hereinafter, embodiments according to the invention will be explained with reference to the drawings.

Embodiment 1

Entire Configuration of Multi-Function Device 1

Figure 1:
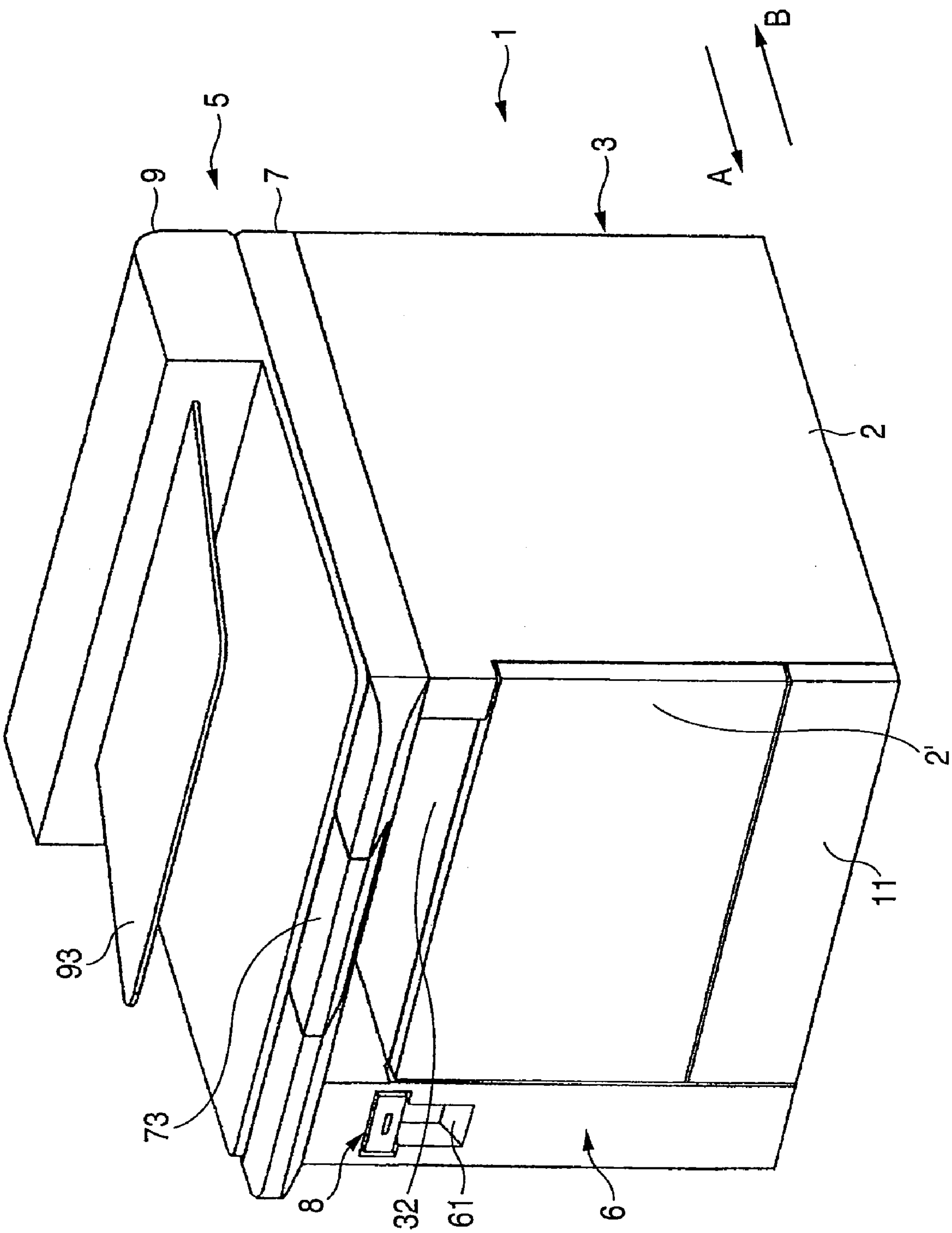
FIG. 1 is a perspective view of a multi-function device according to one embodiment of the present invention.
Figure 2:
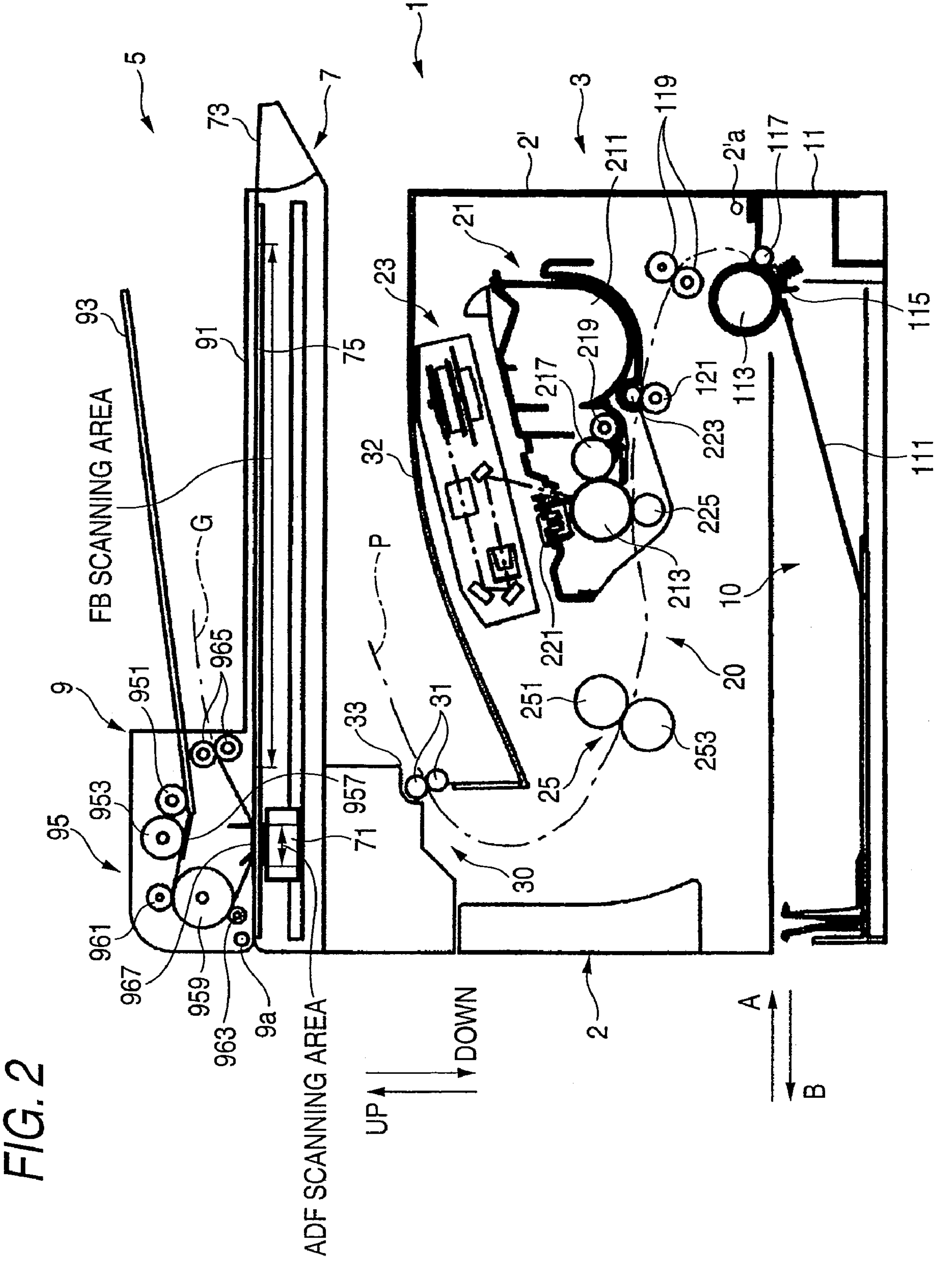
FIG. 2 is a middle sectional view of the multi-function device.

FIG. 1 is a perspective view showing a multi-function device 1 according to the present embodiment. FIG. 2 is a middle sectional view of the multi-function device 1 according to the embodiment. In FIG. 2, it is assumed that the right direction facing the paper surface is regarded as the A direction, the left direction facing the paper surface is regarded as the B direction, the upward direction facing the paper surface is regarded as the upward direction, and the downward direction facing the paper surface is regarded as the downward direction.

As shown in FIG. 1 and FIG. 2, the multi-function device 1 is provided with a printer 3, which is one illustrative aspect of an image forming apparatus, and a scanner 5 disposed upward of the printer, which is one illustrative aspect of an image scanning device.

The scanner 5 scans images on the surface of document sheet G and transmits image data thus scanned to the printer 3.

The printer 3 forms images on the surface of recording sheets P based on the image data transmitted from the scanner 5 and the image data transmitted from an external computer.

<Entire Configuration of Printer 3>

As shown in FIG. 2, the printer 3 includes a feeding unit 10 disposed under the printer 3 body, an image forming unit 20, as one example of the image forming unit, disposed at the downstream side from the feeding unit 10 in the feeding direction of the recording sheets P (hereinafter called a downstream side), an ejection unit 30 disposed at the downstream side of the image forming unit 20, and a casing 2.

The casing 2 includes a front cover 2' located at the A direction side of the casing 2 and having an axis **2'*a* pivotally supported at the casing 2 body, and a front cover 6 fixed at the casing 2 body as shown in FIG. 1, and the casing 2 encloses the image forming unit 20. The front cover 2' swings in the A direction side around the axis 2'*a* and can expose the image forming unit 20 outside the casing 2**.

The feeding unit 10 is provided, as shown in FIG. 2, with a feeding tray 11, a separation roller 113, a separation pad 115, a roll 117, a loading plate 111, a feeding roller 119, and a resist roller 121. The feeding unit 10 feeds recording sheets P to the image forming unit 20.

The feeding tray 11 is box-shaped, the top of which is open. The feeding tray 11 can be drawn from the printer 3 body to the A direction with the recording sheets P accommodated therein.

The recording sheets P can be loaded on the upper side of the loading plate 111. The B direction side end portion of the loading plate 111 is pivotally supported at the feeding tray 111.

The separation roller 113 is provided upward of the A direction side end portion of the loading plate 111. The separation pad 115 is pressed to the separation roller 113 by means of a spring. The separation roller 113 separates the recording sheets P stacked on the loading plate 111 sheet by sheet between the same and the separation pad 115, and feeds the recording sheets P toward the feeding roller 119 between the same and the roll 117.

The feeding roller 119 feeds the recording sheets P sent by the separation roller 113 to a registration roller 121.

The registration roller 121 feeds the leading top of the recording sheets P to the transfer position at predetermined timing after it once stops movement of the leading top of the recording sheets P by regulating the same in regard to the registration roll 223.

The image forming unit 20 forms images on the surface of a recording sheet P fed by the feeding unit 10, and is provided with a process cartridge 21 disposed upward of the feeding unit 10, an exposure unit 23 disposed upward of the process cartridge 21, and a fixture unit 25 disposed at the downstream side of the process cartridge 21.

The exposure unit 23 is provided with a laser diode, a polygon mirror, lenses, and mirrors. The exposure unit 23 irradiates laser beams onto a photosensitive drum 213 based on predetermined image data and exposes the surface of the photosensitive drum 213.

The process cartridge 21 is provided with a development agent accommodation chamber 211, a feeding roller 219, a development roller 217, a photosensitive drum 213, a transfer roller 215, an electrifier 221, and a registration roll 223. The process cartridge 21 transfers images onto the surface of a recording sheet P fed by the feeding unit 10. Further, the process cartridge 21 can be drawn out in the A direction side from the printer 3 body in a state where the front cover 2' is swung in the A direction side.

Toner is accommodated in the development agent accommodation chamber 21 as one example of the development agent, and the toner is fed to the feeding roller 219 while being stirred by a stirring member (not illustrated).

The feeding roller 219 is provided adjacent to the development agent accommodation chamber 211, and feeds toner, which is fed from the development agent accommodation chamber 211, further to the development roller 217.

The development roller 217 is disposed so as to cohere with the feeding roller 219, and carries toner fed by the feeding roller 219 and positively electrified by a sliding member (not illustrated), wherein positive development bias is further applied to the development roller 217 by bias applying means (not illustrated).

The electrifier 221 is a scorotron electrifier, is disposed so as to be opposed to the photosensitive drum 213, and positively electrifies the surface of the photosensitive drum 213.

The photosensitive drum 213 is provided adjacent to the development roller 217, and the surface of the photosensitive drum 213 is exposed by the exposure unit 23 after having been evenly positively electrified by the electrifier 221, whereby an electrostatic latent image whose potential is lower than the other portions is formed.

And, positively electrified toner is supplied from the development roller 217 onto the surface of the photosensitive drum 213 on which an electrostatic latent image is formed, wherein the electrostatic latent image is made visible to become a development agent image.

The transfer roller 215 is disposed so as to be opposite to the photosensitive drum 213, and negative transfer bias is applied thereto by bias applying means (not illustrated). The transfer roller 215 feeds a recording sheet P between the same and the photosensitive drum 213, on which the development agent image is formed, in a state where transfer bias is applied to the surface of the transfer roller 215, while holding the recording sheet P therebetween. Therefore, the transfer roller 215 transfers the development agent image, which is formed on the surface of the photosensitive drum 213, onto the surface of the recording sheet P.

The registration roll 223 is disposed so as to be opposed to the registration roller 121, and is driven and rotated in line with rotations of the registration roller 121.

The fixture unit 25 is provided with the heating roller 251 and the pressing roller 253, by which images transferred by the process cartridge 21 are fixed on a recording sheet P.

The heating roller 251 is made of metal and is made cylindrical, and internally incorporates a heater consisting of a halogen lamp. The heating roller is heated by power being supplied to a heater thereof.

The pressing roller 253 is caused to cohere with the heating roller 251 and is thereby driven, and feeds a recording sheet P, which is fed after a development agent image is transferred thereonto at the transfer position, feeds while being held between the pressing roller 253 and the heating roller 251. Thereby, the development agent image is thermally fixed on the recording sheet P.

The ejection unit 30 is provided with an ejection roller 31, an ejection tray 32 and an ejection port 33.

The ejection port 33 is formed on the casing 2 at the downstream side of the fixture unit 25.

The ejection roller 31 is a pair of rollers and ejects a recording sheet P, which is fed by the fixture unit 25, from the ejection port 33 to the A direction.

The ejection tray 32 is formed integral with the casing 2, and is inclined so as to be elongated upward from the underside portion of the ejection roller 31 toward the A direction. Recording sheets P ejected and dropped by the ejection roller 31 are stacked on the ejection tray 32.

<Entire Configuration of Scanner 5>

The scanner 5 is provided with a flat bed 7 and an automatic document feeder 9 (hereinafter called an ADF 9) disposed upwards of the flat bed 7.

The flat bed 7 is provided with platen glass 75, an image sensor 71, and an operation panel 73.

Document sheets G are placed on the upper side of the platen glass 75.

The image sensor 71 is disposed so as to be opposed to the underside of the platen glass 75, and scans images on the surface of document sheet G fed by the ADF 9 or images on the surface of document sheet G placed on the upper side of the platen glass 75.

As shown in FIG. 2, the image sensor 71 is disposed so as to be opposed to the ADF scanning area positioned at the B direction side at the platen glass 75 when scanning images on the surface of the document sheet G fed by the ADF 9. The image sensor 71 is disposed so as to be opposed to the FB scanning area positioned at the A direction side on the platen glass 75 when scanning images on the surface of a document sheet G placed on the upper side of the platen glass 75.

The operation panel 73 is disposed at the A direction side end portion of the flat bed 7 body, and operation keys (not illustrated) for inputting various types of instructions to the flat bed 7, ADF 9 and printer 3 are disposed on the upper side of the operation panel 73.

The ADF 9 is provided upward of the flat bed 7, and is provided with a document cover 91, a document tray 93, a feeding unit 95 and a rotating axis 9*a*.

The document tray 93 is capable of accommodating a plurality of document sheets G placed thereon.

The document cover 91 encloses the document sheets G placed on the upper side of the platen glass 75, and simultaneously causes the sheets to cohere with the platen glass 75.

The feeding unit 95 is provided with a pick-up roller 951, a separation roller 953, a feeding roller 959, driven rollers 961 and 963, an ejection roller 965 and a pressing plate 967.

The pick-up roller 951 is disposed upward of the B direction side end portion of the document tray, and feeds the document sheets G stacked on the document tray 93 to the separation roller 953.

The separation roller 953 is disposed to be opposed to the separation plate 957 from upward, and feeds document sheets G to the feeding roller 959 while separating the document sheets G, which are sent out by the pick-up roller 951, sheet by sheet by being held between the separation roller 953 and the separation plate 957.

The feeding roller 959 is disposed at the B direction side from the separation roller 953, and feeds the document sheets G, which are fed by the separation roller 953, to the pressing plate 967 while holding the document sheets G between the feeding roller 959 and the driven rollers 961 and 963 and bending the same to be roughly U-shaped.

The pressing plate 967 is disposed at the A direction side from the feeding roller 959, and guides document sheets G, which are fed by the feeding roller 959, so that the surface of the document sheets G is faced to the image sensor 71 via the ADF scanning area of the platen glass 75.

The ejection roller 965 is disposed at the A direction side from the pressing plate 967, and ejects the document sheets G passed through the pressing plate 967 onto the upper side of the document cover 91 in the A direction.

The rotating axis 9*a* is formed at the B direction side end portion at the ADF 9 body, and at the same time, is pivotally supported on the flatbed 7. Thus, the ADF 9 swings in the vertical direction centering around the rotating axis 9*a*, and can open and close the platen glass 75 by means of the document cover 91.

<Operation of Printer 3>

The surface of the photosensitive drum 213 is exposed by high-speed scanning of a laser beam irradiated from the exposure unit 23 after having been evenly and positively electrified by the electrifier 221 in line with the rotation thereof, whereby electrostatic latent images corresponding to images to be formed on a recording sheet are formed on the surface of the photosensitive drum 213.

Next, when the development roller 217 is opposed to and is brought into contact with the photosensitive drum 213, positively electrified toner carried on the development roller 217 is supplied to electrostatic latent images formed on the surface of the photosensitive drum 213, that is, to an exposure portion exposed by a laser beam, the potential of which is lowered, of the evenly and positively electrified photosensitive drum 213 by rotation of the development roller 217. Thereby, the electrostatic latent images of the photosensitive drum 213 are made visible, wherein toner image by reversed development are carried on the surface of the photosensitive drum 213.

After that, the toner images carried on the surface of the photosensitive drum 213 are transferred onto a recording sheet by transfer bias applied to the transfer roller 215. And, the recording sheet on which the toner images are transferred is fed to the fixture unit 25, and heated therein, and toner transferred as the toner images is fixed on the recording sheet, wherein formation of the images is completed.

<Configuration of Front Cover 6 and Connection Member 8>

Next, a detailed description is given of the configuration of the front cover 6 and the connection member 8.

As shown in FIG. 1, a connection member 8 connected to a USB memory 1000 (Refer to FIG. 6) operating as one example of an external device and an external memory unit is supported on the front cover 6 almost at the same height as that of the ejection tray 32, and at the same time, an accommodation portion 61, which is available as one example of a concave portion to accommodate the USB memory 1000 connected to the connection member 8 at the lower part of the connection member, is formed therein.

Figure 3:
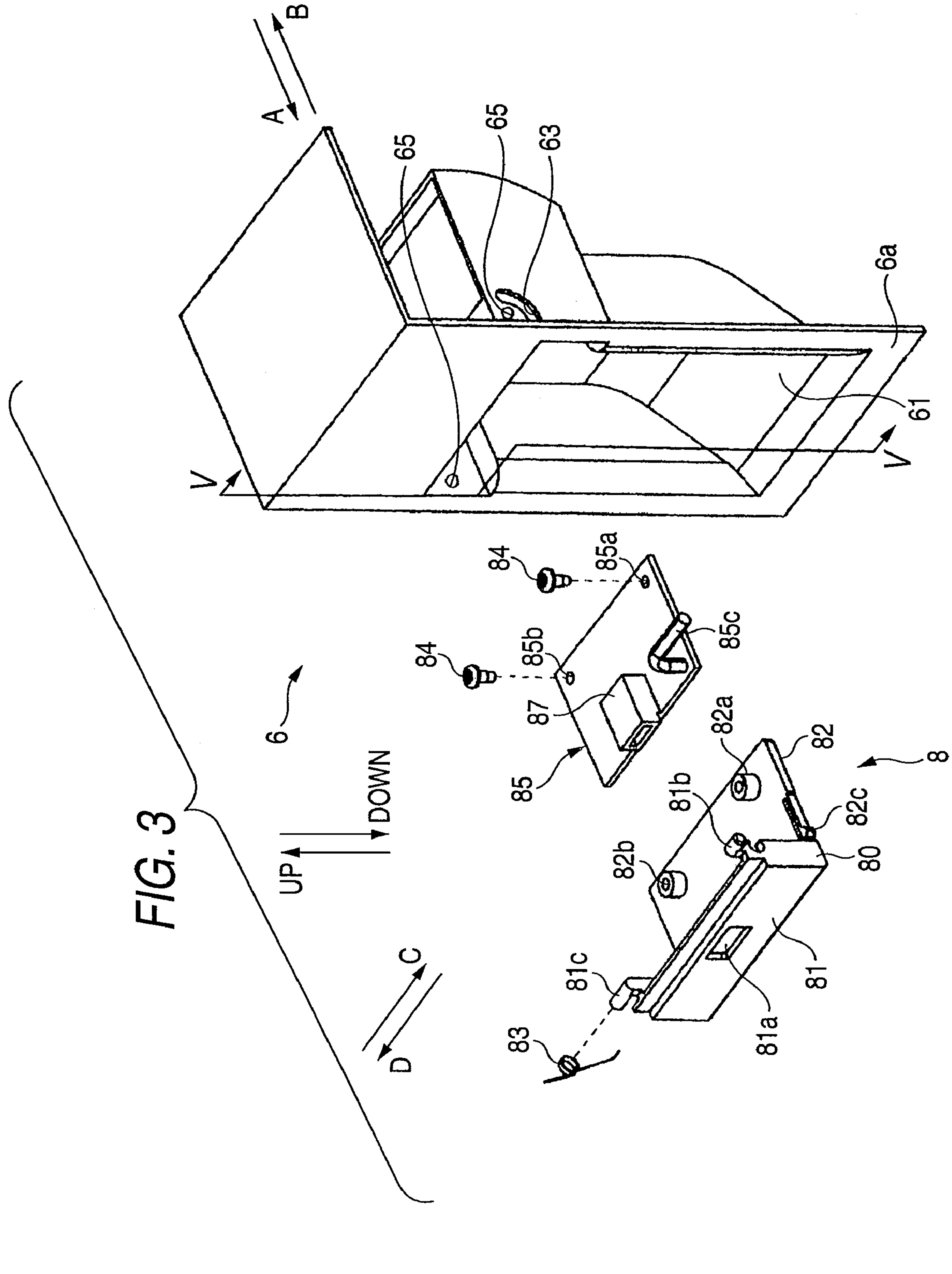
FIG. 3 is a disassembled perspective view showing a front cover and a connection member in the multi-function device.

FIG. 3 is a disassembled perspective view showing a front cover 6 and a connection member 8. Herein, in FIG. 3, it is assumed that, when facing the paper of the drawing, the direction from the left upper part toward the right lower part is regarded as the C direction, and the direction opposed to the C direction is regarded as the D direction.

As shown in FIG. 3, the connection member 8 is provided with a supporting member 80 formed to be roughly L-shaped and rockably supported on the front cover 6, a connector substrate 85 supported on the supporting member 80, a main frame side connector 87 fixed on the connector substrate 85, and a spring 83 operating as pressing means for pressing the connector 87 toward the protrusion position described later via the supporting member 80.

Figure 4:
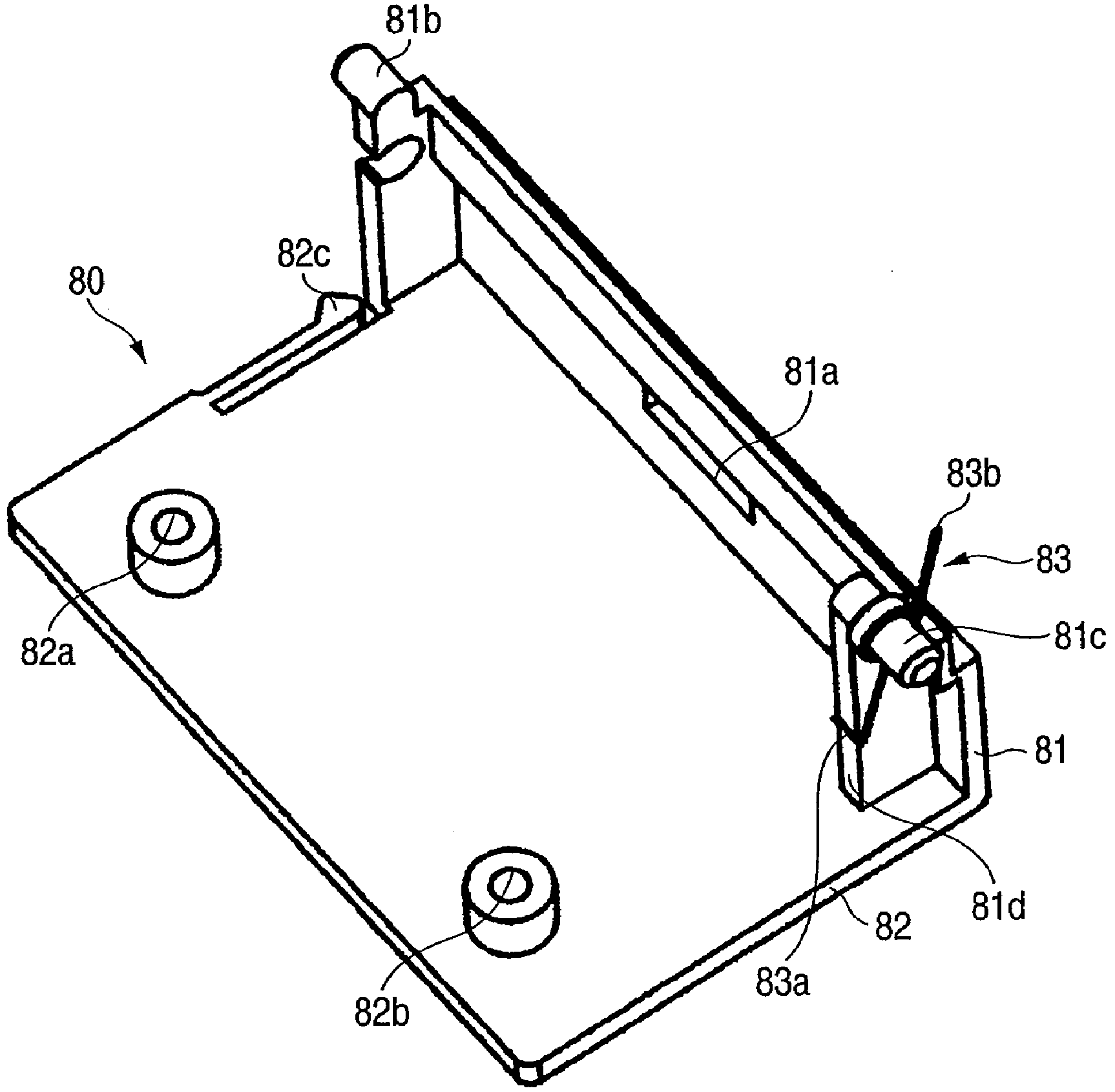
FIG. 4 is a perspective view showing the supporting member when being observed from the side to which a spring is attached.

FIG. 4 is a perspective view showing the supporting member 80 when being observed from the side at which the spring 83 is attached.

The supporting member 81 integrally includes a roughly rectangular connector cover 81 the longer sides of which extend in the C direction and D direction, and an attaching portion 82 extending from one end part of the connector cover 81.

The connector cover 81 has an opening 81*a* formed roughly at the middle part thereof as shown in FIG. 3 and FIG. 4, and rotating axes 81*b* and 81*c* are provided at the end parts opposed to the end parts at which the attaching portion 82 is provided, so as to protrude in the C direction and D direction, respectively. An operating plane 81*d* that receives an action of the pressing force of the spring 83 is formed between the rotating axis 81*c* and the attaching portion 82.

The attaching portion 82 is provided with a pair of screw holes 82*a* and 82*b* for fixing the connector substrate 85 with screws on the side opposed to the connector substrate 85 and an engagement claw 82*c* operating as one example of the engagement member engaged with the front cover 6 at the side from which the rotating axis 81*b* protrudes.

The spring 83 is a twisted coil spring, is wound on the rotating axis 81*c* of the connector cover 81, and at the same time is provided with an operation portion 83*a* brought into contact with the operating plane 81*d* at one end part and operating a pressing force to the supporting member 80 via the operating plane 81*d* and a supported portion 83*b* supported at the supporting plane 67*b* (Refer to FIG. 5) at the other end part.

The connector substrate 85 has screw holes 85*a* and 85*b* formed at the positions thereof corresponding to the screw holes 82*a* and 82*b*, and has a main frame side connector 87, which is fitted in the external device side connector 1001 (Refer to FIG. 6) of the USB memory 1000, fixed at the position corresponding to the opening 81*a* at the opposite side of the side opposed to the attaching portion 82, wherein a flexible cable 85*c* connected to an image processing substrate (not illustrated) secured in the printer 3 body, which corrects the image data, etc., is connected to the end part in the C direction side.

With the configuration, after the connector substrate 85 picks up image data transmitted from the USB memory 1000 to the main frame side connector 87, the connector substrate 85 transmits the data to the image processing substrate via the flexible cable 85*c*. An image forming unit 20 is controlled based on the image data thus transmitted to the image processing substrate and corrected therein and images are formed on the surface of a recording sheet P.

Further, since the screw holes 85*a* and 85*b* are fixed to the screw holes 82*a* and 82*b* of the attaching portion 82 by screws 84, respectively, the connector substrate 85 and the main frame side connector 87 are supported and fixed at the supporting member 80.

Figure 5:
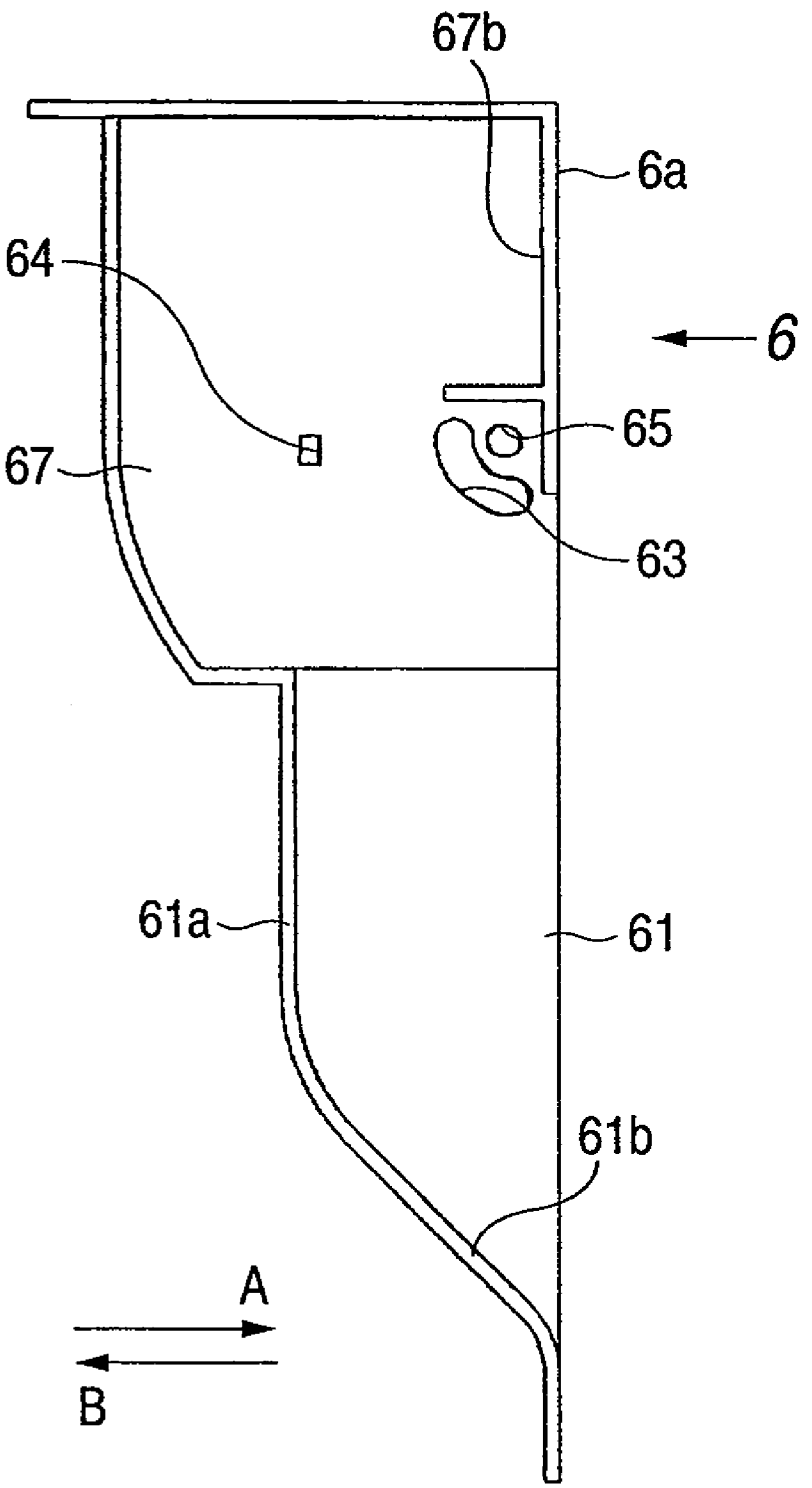
FIG. 5 is a sectional view taken along the line V-V in FIG. 3.

FIG. 5 is a sectional view taken along the line V-V in FIG. 3.

As shown in FIG. 5, a chamber 67 for accommodating the connection member 8 is formed upward of the accommodation portion 61 in the front cover 6.

As shown in FIG. 3 and FIG. 5, the connection member accommodating chamber 67 has holes 65 formed at the sides opposed to each other in the C direction and D direction, which respectively support the rotating axes 81*b* and 81*c*. A long hole 63 for passing the flexible cable 85*c* therethrough and an engagement hole 64 with which the engagement claw 82*c* is engaged are formed at the side in the C direction.

In addition, a supporting plane 67*b* for supporting a supported portion 83*b* of the spring 83 is formed at the opposite side of the front plane 6*a* facing in the A direction of the front cover 6 in the connection member accommodation chamber 67.

As shown in FIG. 5, the accommodation portion 61 includes a vertical wall 61*a* extending perpendicularly downward from the lower end part of the connection member accommodation chamber 67 and an inclined wall 61*b* extending downward from the lower end of the vertical wall 61*a* toward the A direction. Also, the lower end of the inclined wall 61*b* is formed to be continuous to the front plane 6*a* of the front cover 6 (Refer to FIG. 6).

Actions Based on the Configuration of the Present Embodiment

Next, a description is given of actions based on the configuration of the present embodiment.

Figure 6:
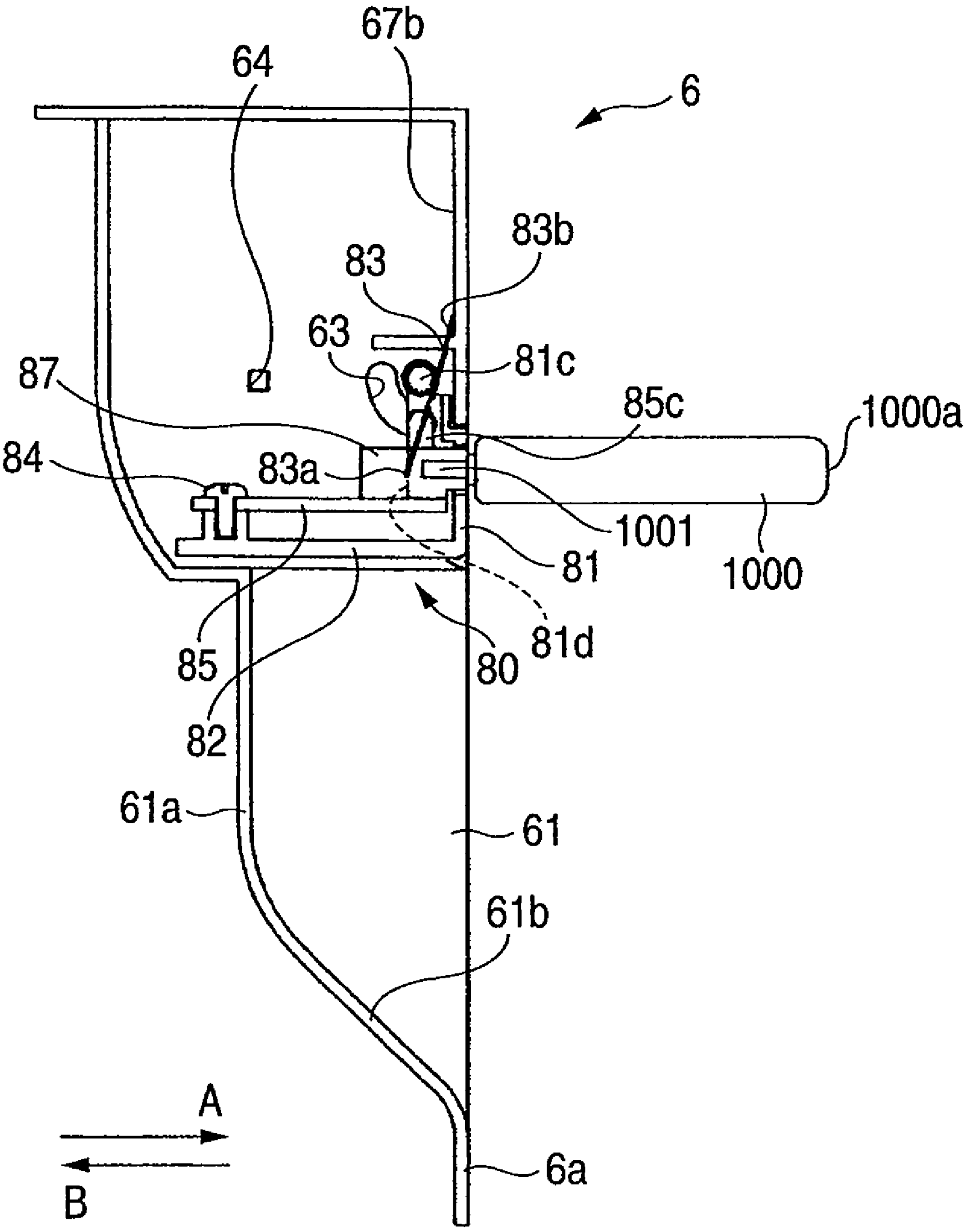
FIG. 6 is a view showing a state where the connection member is attached and is located at a protrusion position, in the sectional view taken along the line V-V in FIG. 3.

FIG. 6 is a view showing a state, where the main frame side connector 87 is located at its protrusion position with the connection member 8 assembled in the front cover 6, in the sectional view taken along the line V-V in FIG. 3.

The USB memory 1000 integrally includes an external device side connector 1001. That is, the external device side connector 1001 is fixed on the USB memory 1000 body.

As shown in FIG. 6, the USB memory 1000 is fitted to the main frame side connector 87 in a state where the USB memory 1000 protrudes outward from the front plane 6*a* of the front cover 6.

Thus, in a state where the external device side connector 1001 is fitted to the main frame side connector 87, the main frame side connector 87 is located at its protrusion position where the portion 1000*a* of the USB memory 1000, which is farthest from the main frame side connector 87, is protruded outward of the front plane 6*a* of the front cover 6.

Figure 7:
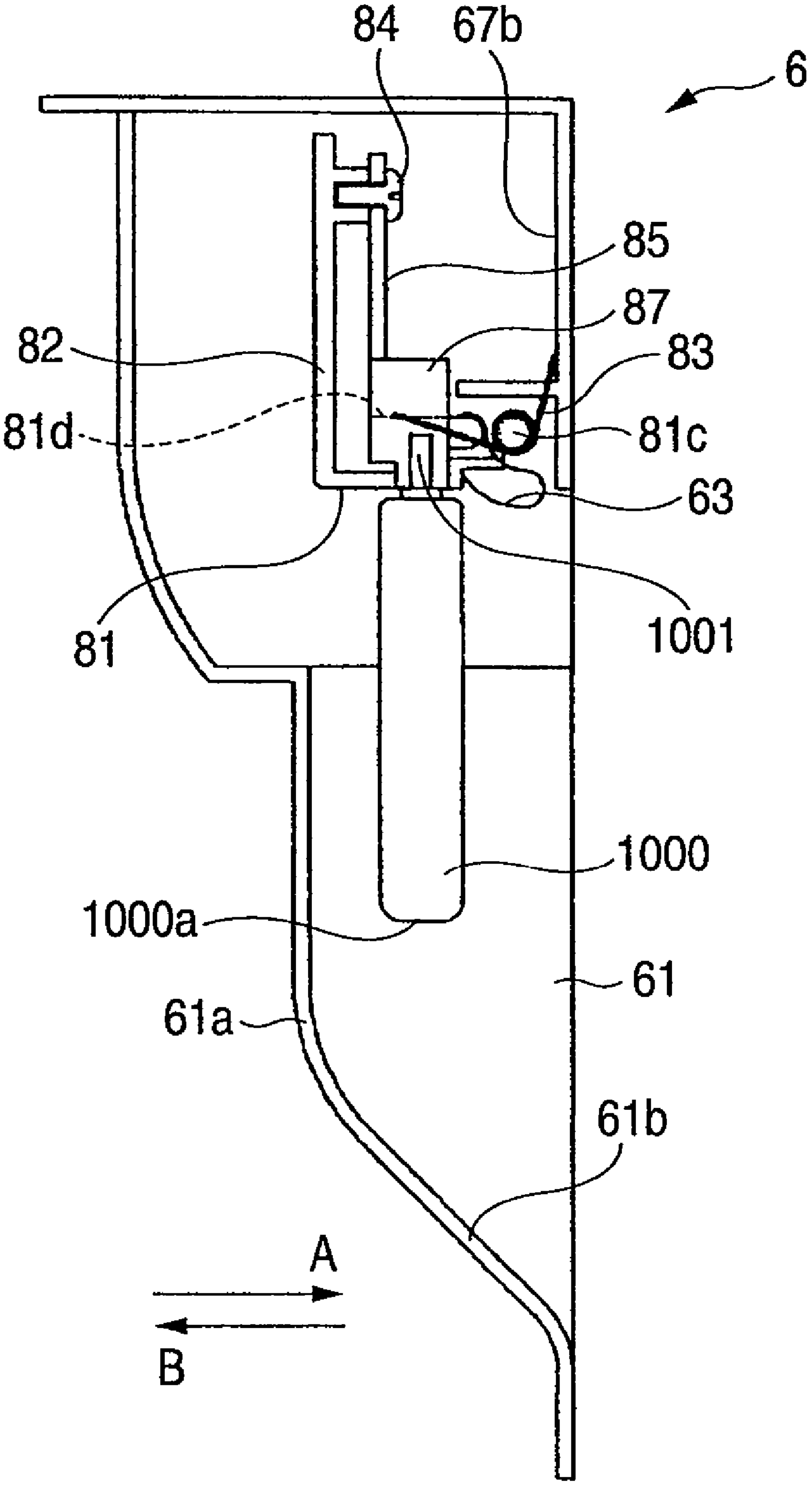
FIG. 7 is a view showing a state where the connection member is assembled and is located at a retraction position, in the sectional view taken along the line V-V in FIG. 3.

FIG. 7 is a view showing a state where the connection member 8 is assembled and the main frame side connector 87 is located at a retraction position, in the sectional view taken along the line V-V in FIG. 3.

As shown in FIG. 7, if the USB memory 1000 is shifted to the position where it is accommodated in the accommodation portion 61 against a pressing force of the spring 83, it is fixed at the position based on engagement of the engagement claw 82*c* in the engagement hole 64.

Thus, the main frame side connector 87 is located at its retraction position in a state where the USB memory 1000 is accommodated in the accommodation portion 61.

Further, in such a state, in the main body of the USB 1000, all the portions including the portion 1000*a* farthest from the main frame side connector 87 do not protrude from the front plane 6*a* of the front cover 6.

Effects Based on the Configuration of the Present Embodiment

If, when the main frame side connector 87 is located at its protrusion position, a user drops a bundle of recording sheets P stacked in the ejection tray 32 by mistake, and the bundle of recording sheets P is brought into collision with the USB memory 1000 body connected to the main frame side connector 87 and protruded outward of the casing 2, that is, outward of the front plane 6*a*, and the external device side connector 1001, the main frame side connector 1001 is displaced downward.

As a result, since a force given to the main frame side connector 87 by the collision is weakened, it is possible to prevent the main frame side connector 87 from being subjected to damage.

Since, when the main frame side connector 87 is located at its protrusion position, the external device side connector 1001 fitted in the main frame side connector 87 is brought into a state protruded outward of the casing 2, it becomes easy to detach the external device side connector 1001 from the main frame side connector 87. Also, similarly, when the main frame side connector 87 is located at its protrusion position, the external device side connector 1001 is fitted to the main frame side connector 87 in a state where it is protruded outward of the casing 2 when fitting them together. Therefore, it becomes easy to attach the external device side connector 1001 to the main frame side connector 87.

In addition, when the main frame side connector 87 is located at its retraction position, the amount of protrusion by which the external device side connector 1001 protrudes outward of the casing 2, that is, outward of the front plane 6*a*, is decreased further than that when it is located at the protrusion position. Therefore, if a user retracts the main frame side connector 87 to its retraction position in advance after the external device side connector 1001 is attached to the main frame side connector 87, a possibility for the bundle of recording sheets taken out from the ejection tray 32 to be brought into collision with the above-described external device side connector 1001 and the USB memory 1000 body can be reduced. As a result, it is possible to prevent the above-described USB memory 1000 from being subjected to damage.

Further, since, when the main frame side connector 87 is located at its retraction position, the USB memory 1000 is accommodated in the accommodation portion 61, it is possible to further securely prevent the USB memory 1000 from being subjected to damage due to a collision of the bundle of recording sheets.

Still further, since the supporting member 80 is engaged in the engagement hole 64 formed on the front cover 61 when the main frame side connector 87 is displaced to its retraction position, the main frame side connector 87 can be fixed at the position. As a result, it is possible to prevent the USB memory 1000 from being subjected to damage due to being brought into contact with the bundle of recording sheets due to the main frame side connector 87 being given an external force and being displaced from the retraction position to the protrusion position although this is not intended by a user.

Also, since the main frame side connector 87 is pressed to its protrusion position by the spring 83, the main frame side connector 87 is located at the protrusion position excepting a case where the engagement claw 82*c* is engaged in the engagement hole 84. As a result, a user can easily attach the external device side connector 1001 to the main frame side connector 87.

Embodiment 2

Next, Embodiment 2 will be explained. The present embodiment differs from Embodiment 1 in that the USB cable 2002 is connected to the main frame side connector 87. Descriptions of components that are similar to those of Embodiment 1 will be omitted.

Figure 8:
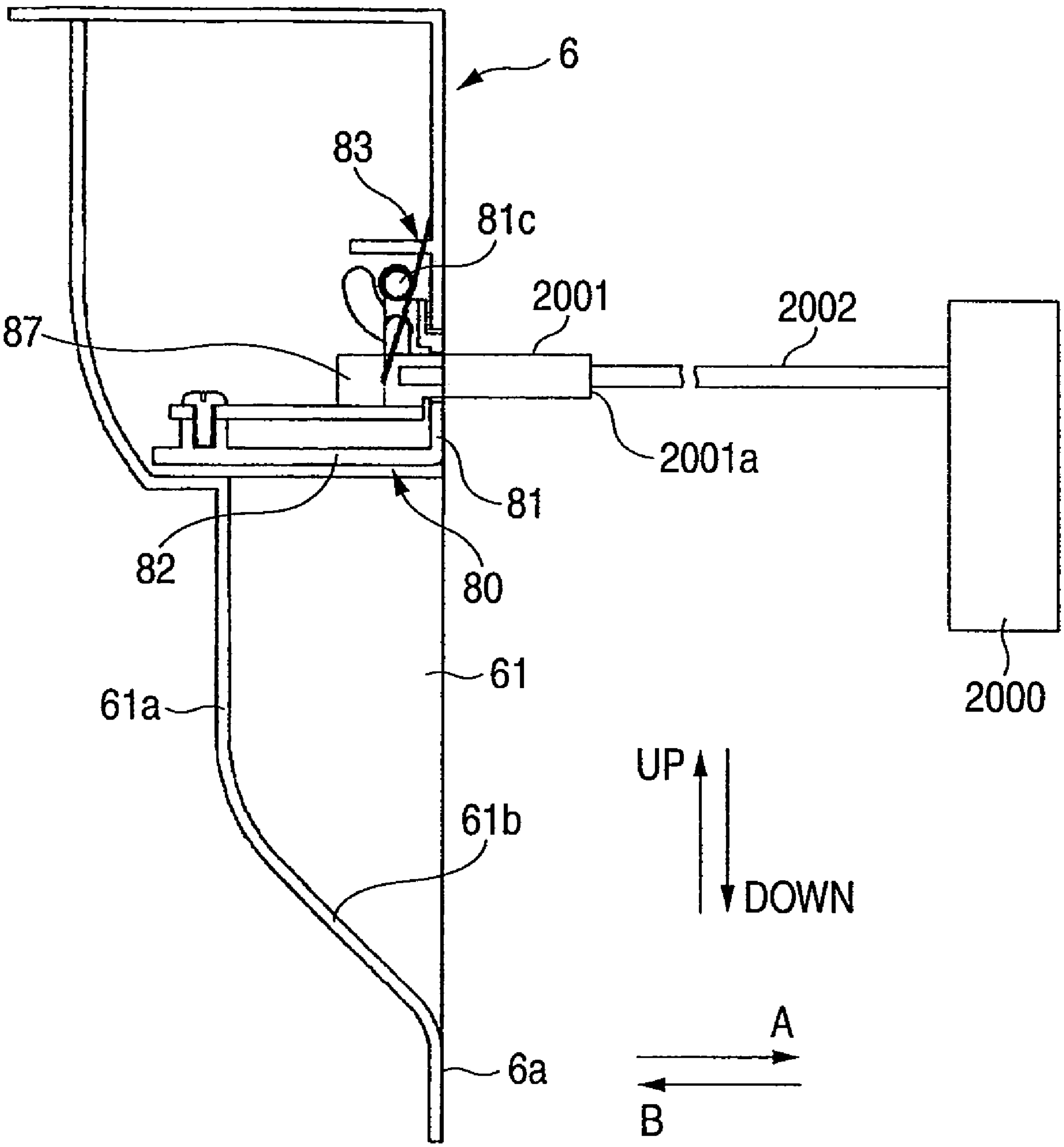
FIG. 8 is a view showing that a USB cable is connected when the main frame side connector is located at a protrusion position, in the sectional view taken along the line V-V in FIG. 3.

FIG. 8 is a view showing that a USB cable 2002 is connected when the main frame side connector 87 is located at a protrusion position, in the sectional view taken along the line V-V in FIG. 3.

As shown in FIG. 8, a digital camera 2000 that is an example of the external device is provided with an external device side connector 2001 and a USB cable 2002 for connecting the external device side connector 2001 to the digital camera 2000. The digital camera 2000 picks up an object and generates image data pertaining to the object, and transmits the data to a multi-function device 1 via the external device side connector 2001.

As shown in FIG. 8, the main frame side connector 87 is fitted in the external device side connector 2001 connected to the digital camera 2000 body by means of the USB cable 2002 when it is located at its protrusion position.

In such a state, the portion 2001*a*, farthest from the main frame side connector 87, of the external device side connector 2001 protrudes outward from the front cover 6.

Figure 9:
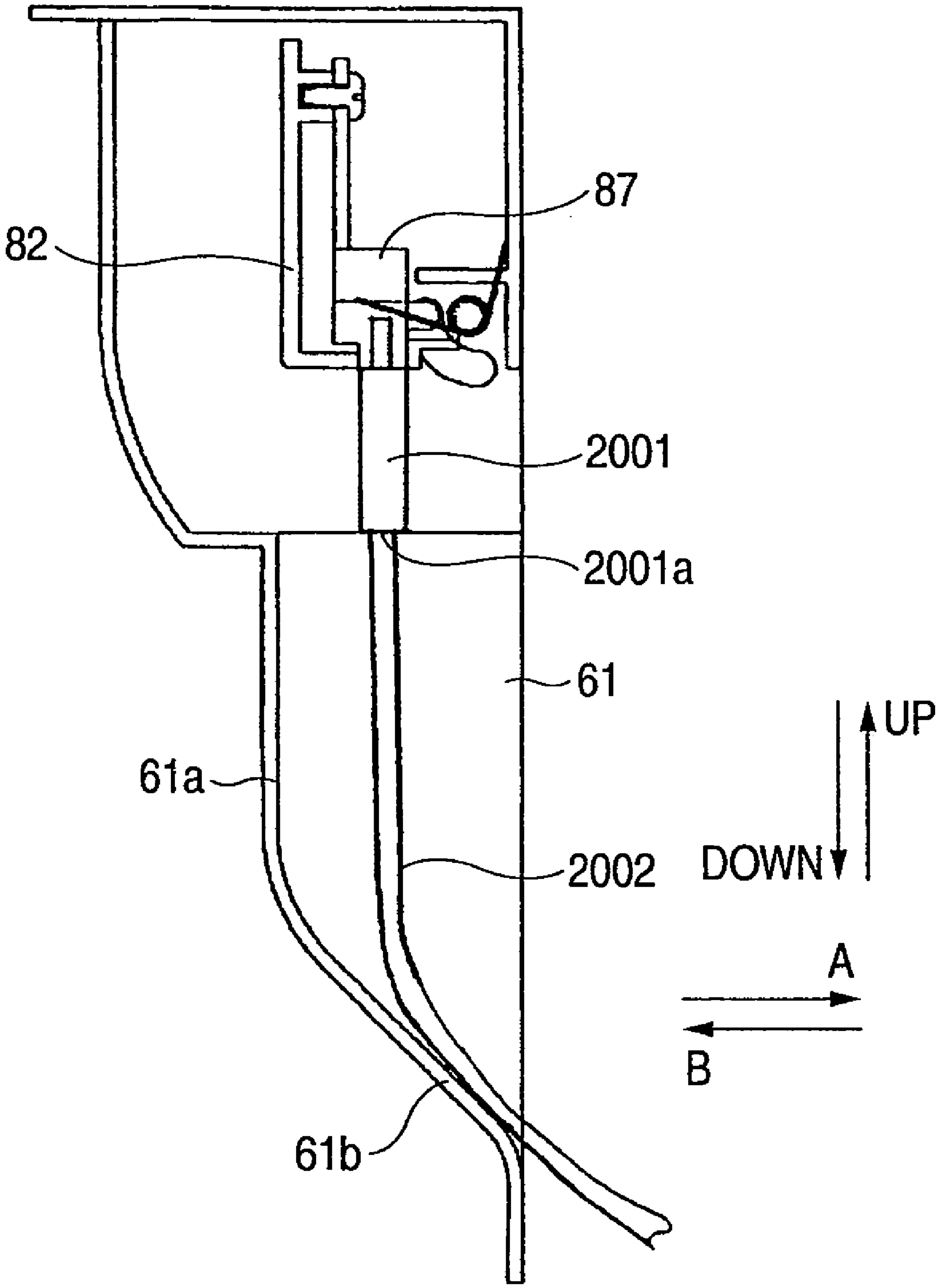
FIG. 9 is a view showing a state where the main frame side connector is disposed at a retraction position, in the sectional view taken along the line V-V in FIG. 3.

FIG. 9 is a view showing a state where the main frame side connector 87 is disposed at a retraction position, in the sectional view taken along the line V-V in FIG. 3.

The external device side connector 2001 is disposed, as shown in FIG. 3, at a position where it protrudes outward from the front cover 6, that is, in the connection member accommodation portion 67 when the main frame side connector 87 is located at its retraction position. In such a state, the USB cable 2002 suspends downward from the external device side connector 2001, and at the same time, is brought into contact with the inclined wall 61*b*, and it gently extends outward of the front cover 6 along the inclination of the inclined wall 61*b*.

Provisionally, where the vertical wall 61*a* is inclined so as to perpendicularly extend in regard to the inclined wall 61*b*, if the USB cable 2002 suspending downward from the external device side connector 2001 is brought into contact with the inclined wall 61*b*, the USB cable 2002 is radically bent. If the USB cable 2002 is radically bent like this, a large force operates on the external device side connector 2001, and large load is given to the external device side connector 2001 and the main frame side connector 87.

However, since, in the present embodiment, the inclined wall 61*b* is inclined and formed so as to extend downward from the lower end part of the vertical wall 61*a* while advancing in the A direction, the USB cable 2002 is not greatly bent in comparison with a case where the inclined wall 61*b* is perpendicularly provided in regard to the vertical wall 61*a*. As a result, load applied to the main frame side connector 87 and the external device side connector 2001 is reduced.

In addition, where the main frame side connector 87 is located at its retraction position, the USB cable 2002 is retracted to the printer 3 body side, and at the same time, is accommodated in the accommodation portion 61, wherein it is possible to reduce the amount of protrusion of the USB cable 2002 outward of the front cover 6. As a result, it is possible to prevent the main frame side connector 87, etc., from being subjected to damage due to a bundle of recording sheets P dropped by a user by mistake brought into collision with the USB cable 2002.

Embodiment 3

Next, Embodiment 3 will be explained. Embodiment 3 differs from Embodiment 1 in the configurations of the front cover 60 and the connection member 4. Descriptions of the components that are similar to those of Embodiment 1 will be omitted.

<Configuration of Front Cover 60 and Connection Member 4>

Next, a detailed description is given of the configuration of the front cover 60 and the connection member 4.

Figure 10:
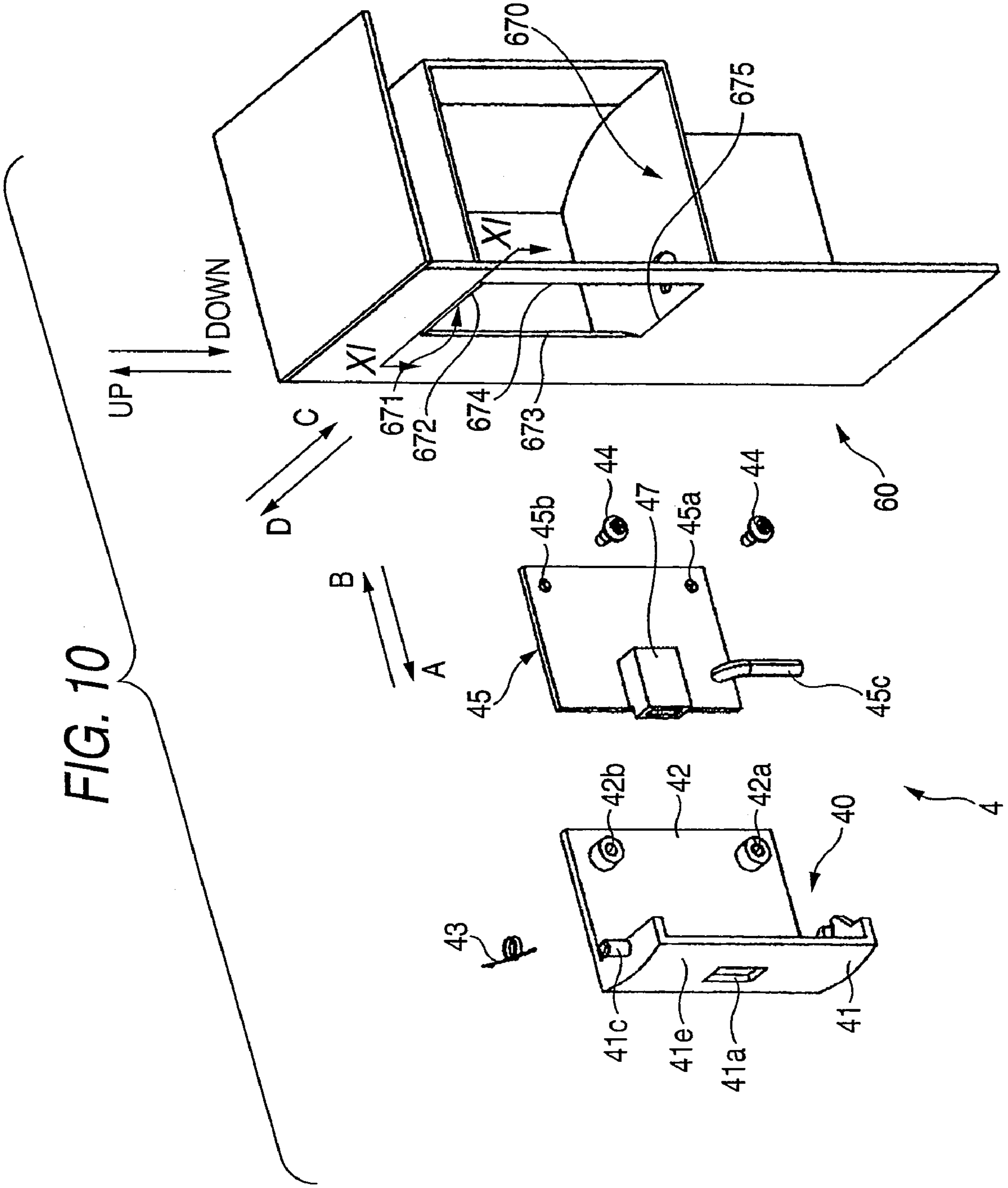
FIG. 10 is a disassembled perspective view showing the front cover and the connection member.

FIG. 10 is a disassembled perspective view of the front cover 60 and the connection member 4.

As shown in FIG. 4, the connection member 4 is provided with a supporting member 40 rockably supported at the front cover 60 formed to be roughly L-shaped, a connector substrate 45 supported at the supporting member 40, a main frame side connector 47 fixed on the connector substrate 45, and a spring 43 operating as pressing means for pressing the main frame side connector 47 toward a protrusion position described later via the supporting member 40.

As shown in FIG. 10, the supporting member 40 integrally includes a roughly rectangular connector cover 41 the long sides of which extend in the vertical direction, and an attaching portion 42 extending from one end part of the connector cover 41.

The connector cover 41 has an opening 41*a* formed roughly at its middle part, and rotating axes 41*b* and 41*c* (Refer to FIG. 12) are formed so as to protrude in the lower and upper directions, respectively, at the end part of the opposite side of the end part where the attaching portion 42 is provided.

Also, the decoration plane 41*e* facing in the A direction of the connector cover 41 is formed so that the middle part thereof in the C direction and the D direction becomes arcuate so as to protrude in the A direction.

The attaching portion 42 has a pair of screw holes 42*a* and 42*b* formed on the side opposed to the connector substrate 45, by which the connector substrate 45 is fixed with screws.

The spring 43 is a twisted coil spring, is wound on the rotating axis 41*c* of the connector cover 41, and at the same time, includes an operation portion 43*a*, brought into contact with the connector cover 41 at one end part thereof, for operating a pressing force thereto, and a supported member 43*b* supported at the supporting plane 677*b* (Refer to FIG. 13) of the front cover 60 at the other end part thereof.

The connector substrate 45 includes screw holes 45*a* and 45*b* formed at positions corresponding to the screw holes 42*a* and 42*b*. In the connector substrate 45, the main frame side connector 47 that is fitted to the external device side connector 1001 of the USB memory 1000 at a position corresponding to the opening 41*a* is fixed at the opposite side of the side opposed to the attaching portion 42, and a flexible cable 45*c* connected to an image processing substrate of the printer 3 body is connected to the end part downward of the connector substrate 45.

Since the screw holes 45*a* and 45*b* are fixed with screws 44 to the screw holes 44*a* and 44*b* of the attaching portion 42, the connector substrate 45 and the main frame side connector 47 are supported on and fixed at the supporting member 40.

A connection member accommodation portion 670 in which the connection member 4 is accommodated is formed in the front cover 60 as shown in FIG. 10.

Figure 11:
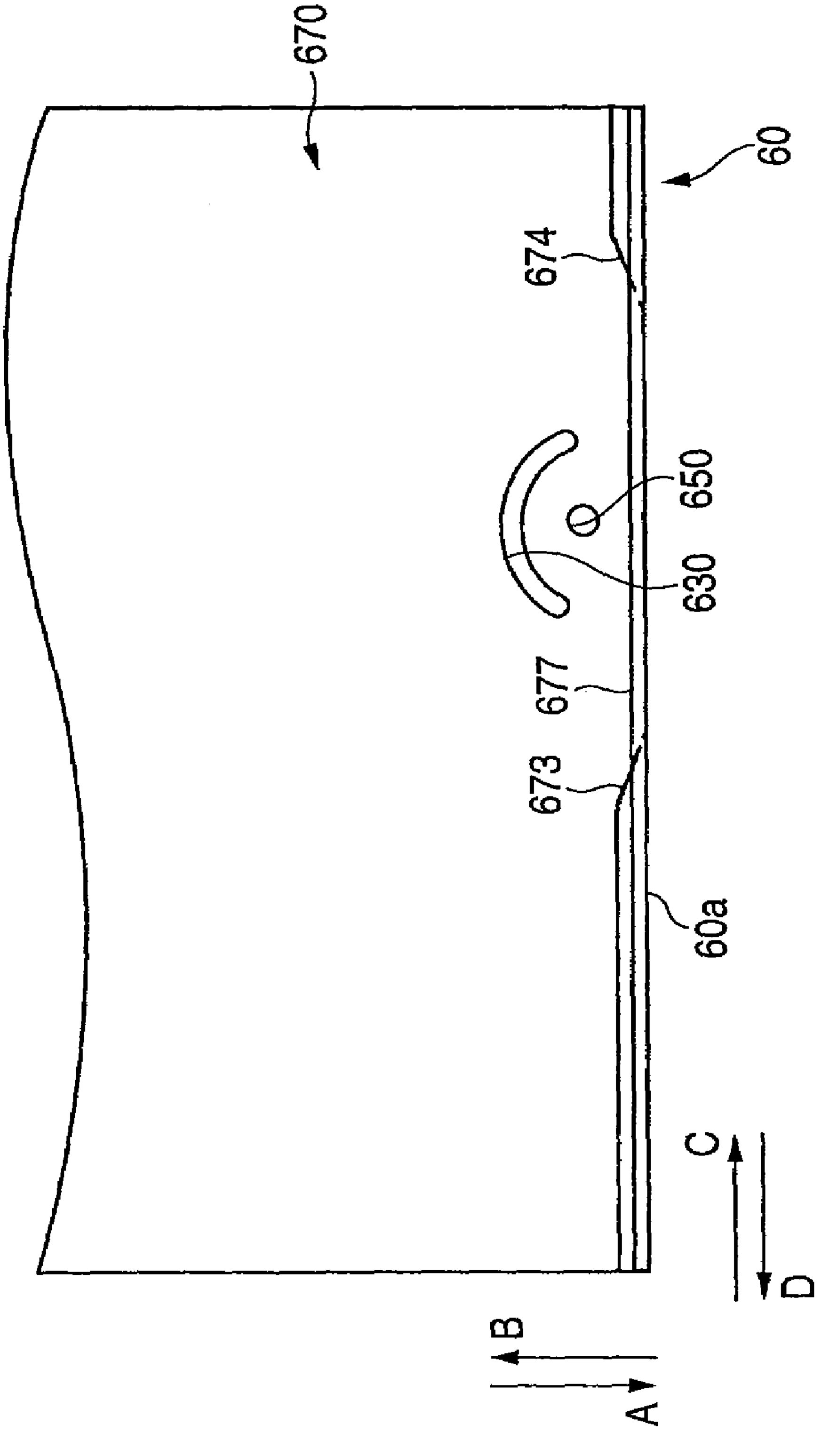
FIG. 11 is a sectional view taken along the line XI-XI in FIG. 10.

FIG. 11 is a sectional view taken along the line XI-XI in FIG. 10.

Figure 12:
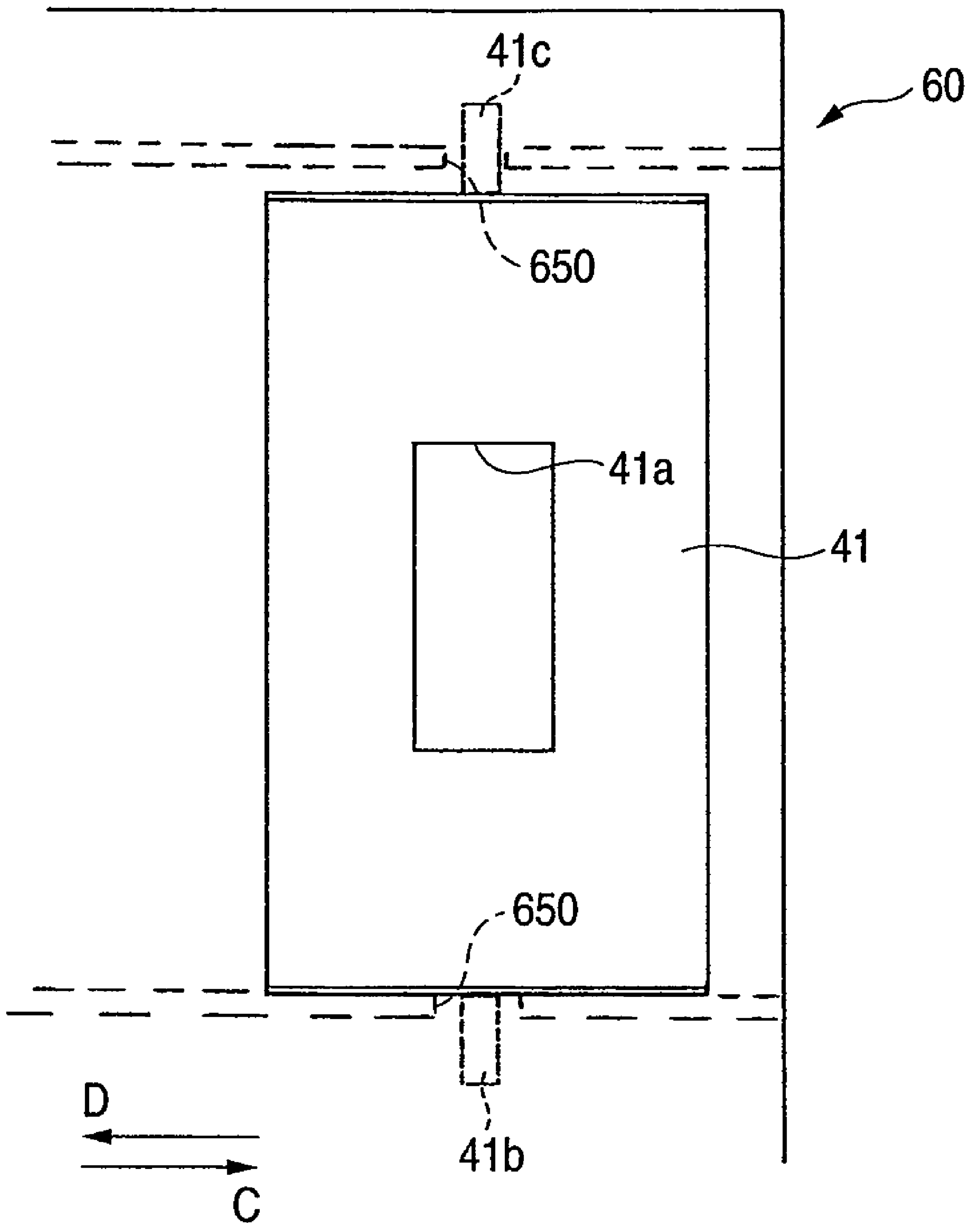
FIG. 12 is a view taken in the B direction of the front cover.

FIG. 12 is a view taken in the B direction of the front cover 60.

As shown in FIG. 11 and FIG. 12, holes 650 supporting the rotating axes 41*b* and 41*c*, respectively, are formed on the sides opposed to each other in the vertical direction in the connection member accommodation portion 670, and a long hole 630 through which a flexible cable 45*c* is passed is formed on the downward side.

As shown in FIG. 10, in the front cover 60, a rectangular opening 671 is formed to expose the decoration plane 41*e* of the connector cover 41 in the A direction.

The opening 671 includes an upper wall 672 and a lower wall 675, which are opposed to each other in the vertical direction, and a D side wall 673 and a C side wall 674, which are opposed to each other in the horizontal direction.

As shown in FIG. 11, the D side wall 673 is faced in the C direction side, and at the same time, is inclined and formed so as to extend in the C direction while advancing in the A direction.

The C side wall 674 is faced in the D direction side, and at the same time, is inclined and formed so as to extend in the D direction while advancing in the A direction.

Figure 13:
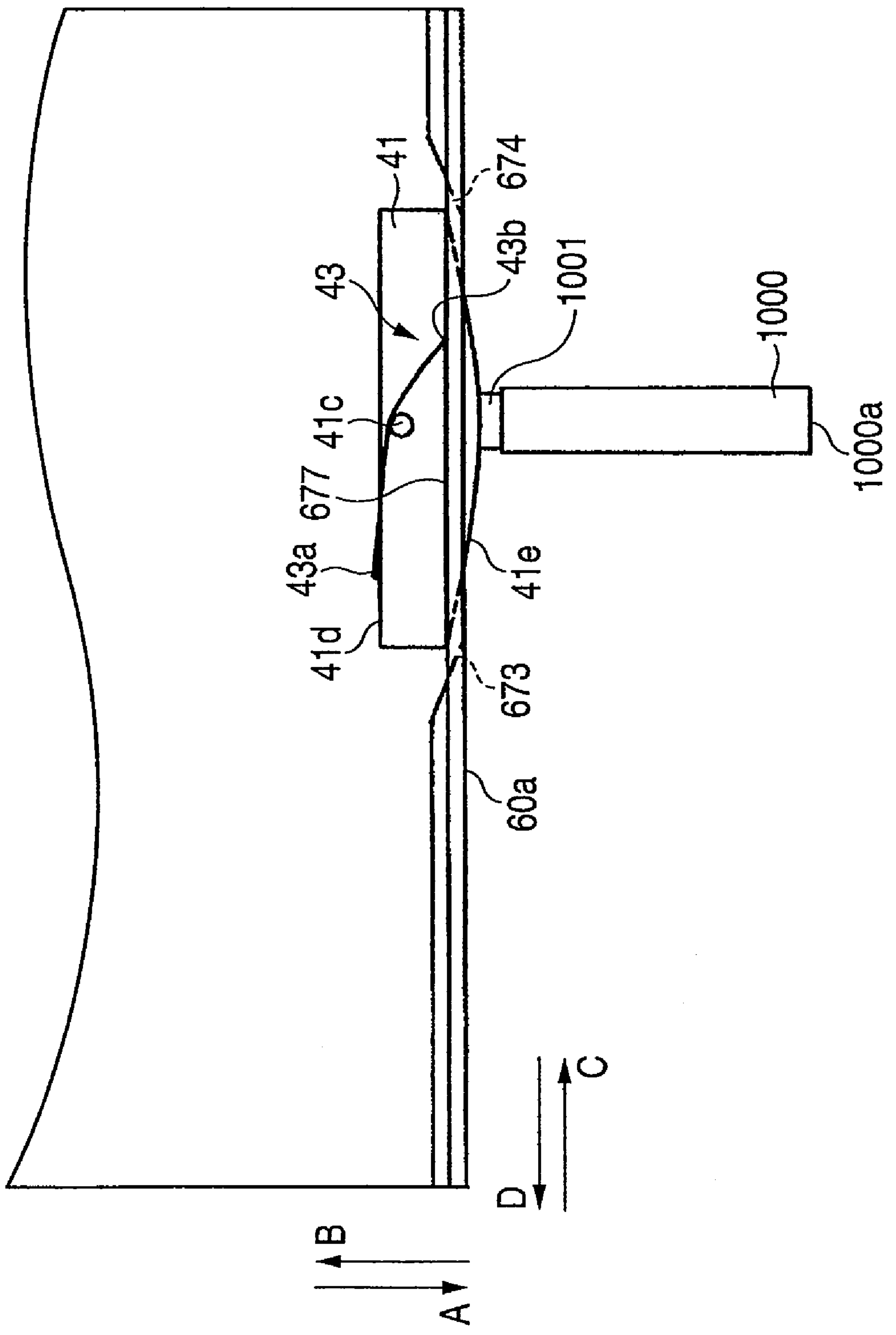
FIG. 13 is a view showing a state where the connection member is attached to the front cover, in the sectional view taken along the line XI-XI in FIG. 10.

As shown in FIG. 11, a supporting plane 677 faced in the B direction side, which supports the supported member 43*b* of the spring 43 is formed upward of the upper wall 672 (Refer to FIG. 13).

FIG. 13 is a view showing a state where the connection member 4 is attached to the front cover 60, in the sectional view taken along the line XI-XI in FIG. 10.

With the connection member 4 attached to the front cover 60, the main frame side connector 47 is pressed by the spring 43 so that, as shown in FIG. 13, the portion 1001*a* farthest from the main frame side connector 47 of the USB memory 1000 is located at the protrusion position most protruded to the A direction side from the front plane 60*a*. Herein, in such a state, as shown in FIG. 13, the decoration plane 41*e* is isolated from the D side wall and the C side wall by a predetermined distance. The supporting member 40 is rockable clockwise and counterclockwise in FIG. 13 by the isolated distance using the rotating axis 41*c* as its rocking axis.

Figure 14:
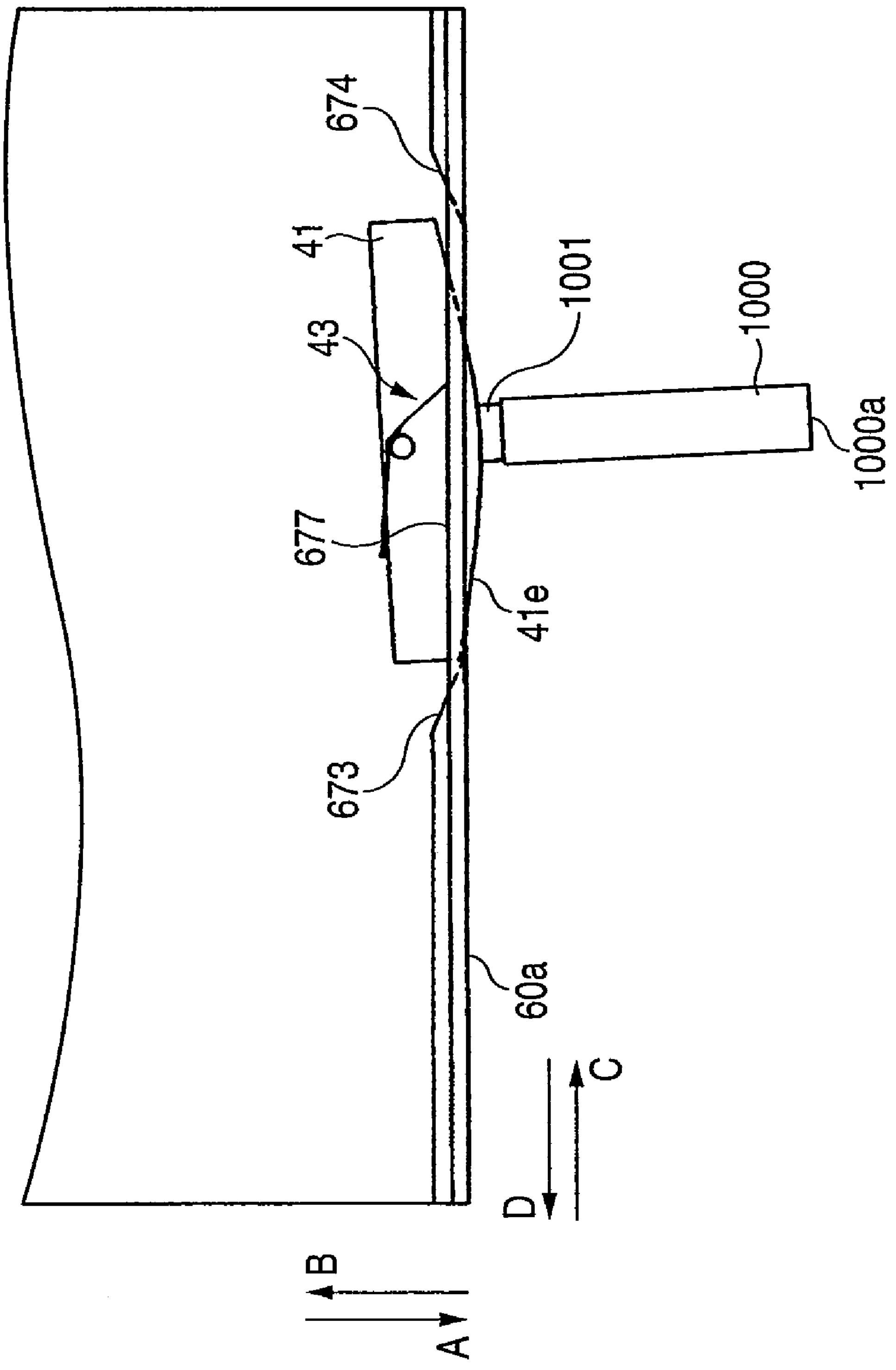
FIG. 14 is a view showing a state where the supporting member is located at a retraction position, where the decoration plane and the D side wall approach each other, from the protrusion position.

FIG. 14 is a view showing a state where the main frame side connector 47 is rocked counter clockwise from the protrusion position in FIG. 13 and is located at its retraction position where the decoration plane 41*e* approaches the D side wall.

With the configuration, for example, as shown in FIG. 13, where an external force oriented in the C direction side operates on the USB memory 1000 or the external device side connector 1001 when the main frame side connector 47 is located at its protrusion position, the main frame side connector 47 is rocked to its retraction position so as to relieve the force as shown in FIG. 14.

As a result, it is possible to further prevent the main frame side connector 47 from being subjected to damage by the external force in comparison with a case where the main frame side connector 47 is fixed at the front cover 60.

In this connection, the external force in the present embodiment may be, for example, a force that a bundle of recording sheets exerts on the USB memory 1000 when a bundle of recording sheets dropped by mistake after having been taken out by a user from the ejection tray 32 is brought into collision with the USB memory 1000 from the D direction side and a force that a hand of a user exerts on the USB memory 1000 when the hand is brought into collision with the USB memory 1000 from the D direction side.

Similarly, where an external force that is oriented in the D direction side operates on the USB memory 1000 in the state shown in FIG. 13, the main frame side connector 47 is rocked clockwise in FIG. 13.

As a result, it is possible to further prevent the main frame side connector 47 from being subjected to damage by the external force in comparison with a case where the main frame side connector 47 is fixed at the front cover 60.

Embodiment 4

Next, Embodiment 4 will be explained. Embodiment 4 is an illustrative example according to the invention with respect to a single printer 3, and differs from Embodiment 1 in that a connection member 800 is disposed at the lower side of the ejection tray 32. A description of components that are similar to those of Embodiment 1 is omitted.

Figure 15:
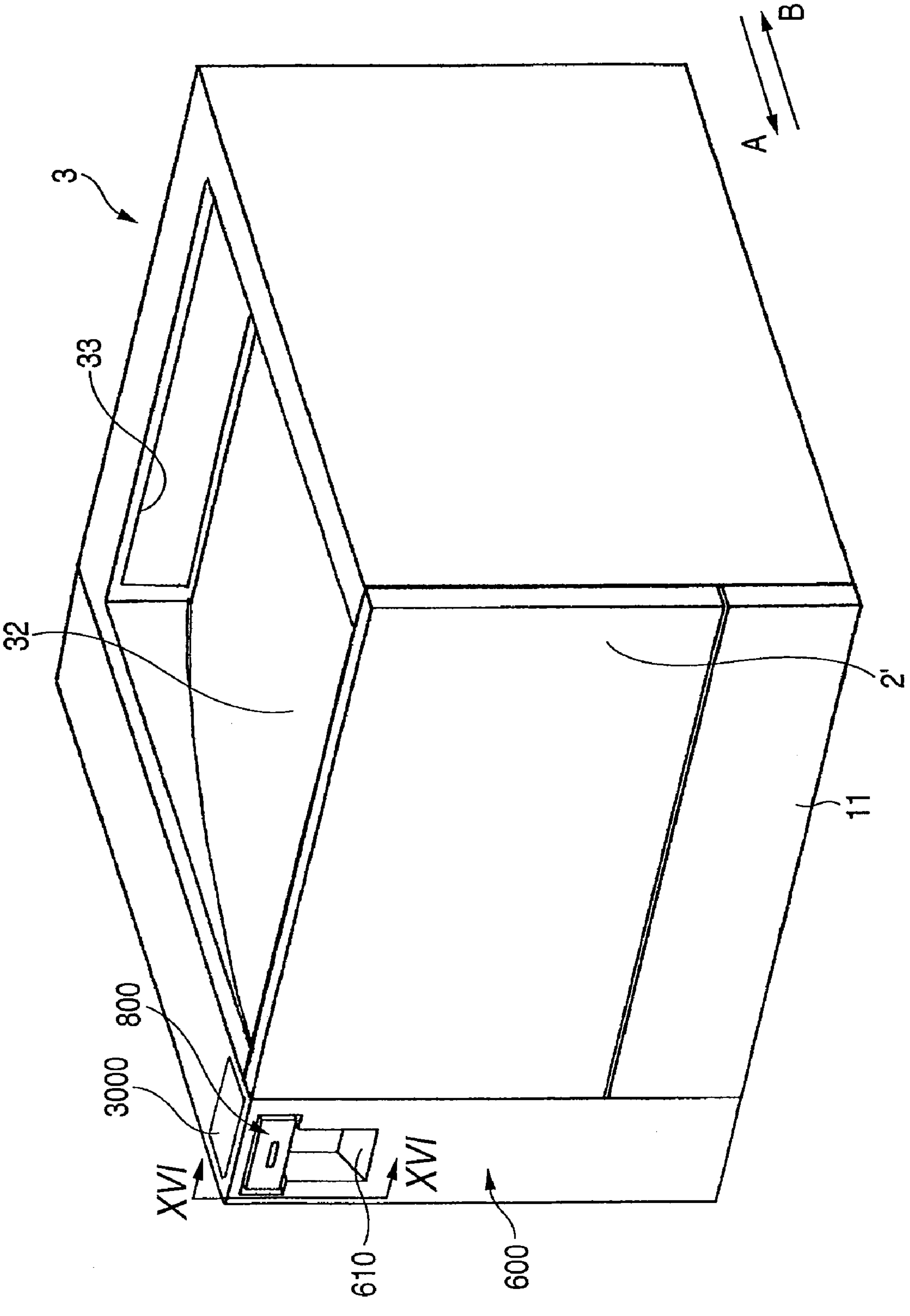
FIG. 15 is a perspective view of a printer.
Figure 16:
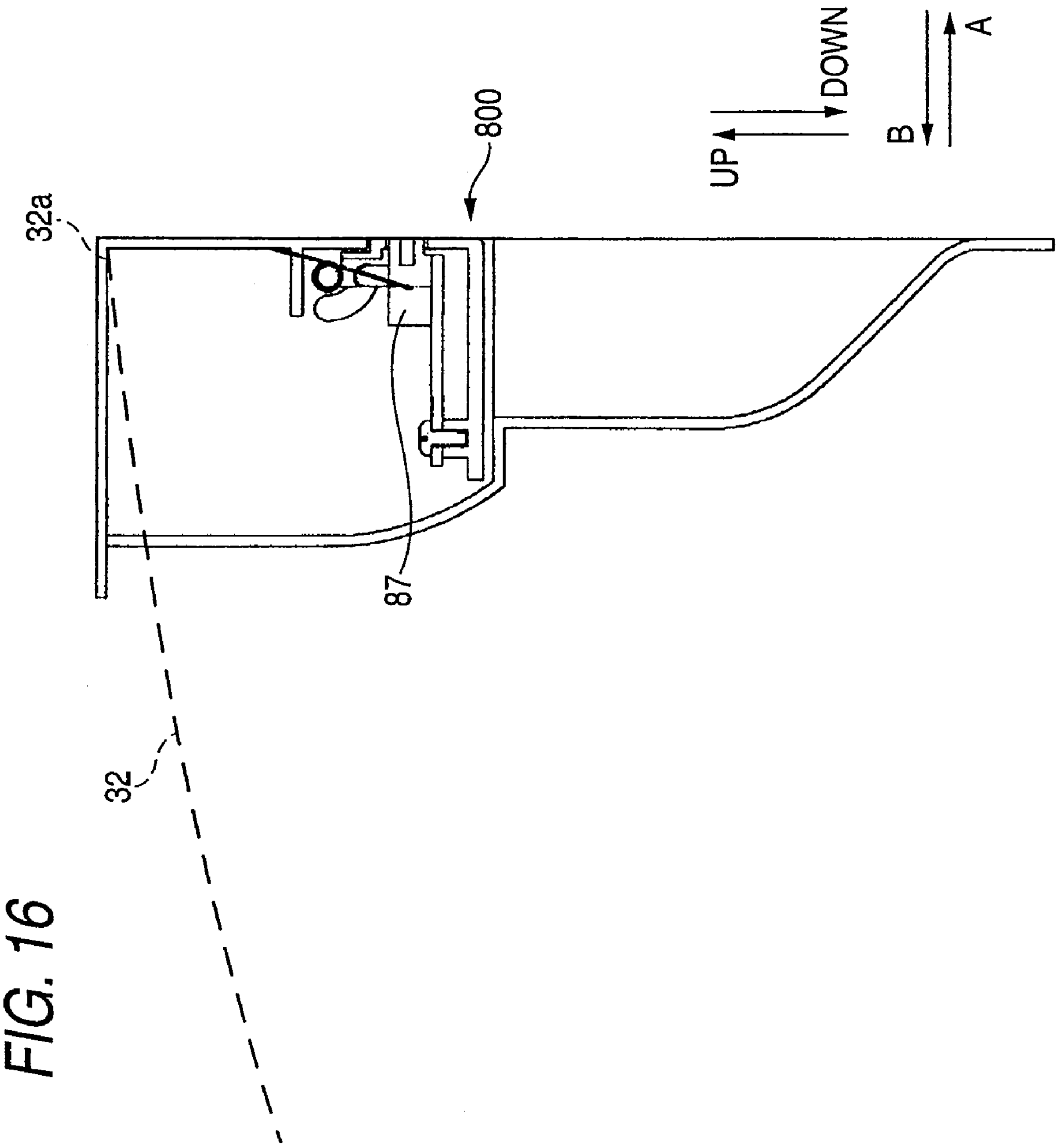
FIG. 16 is a sectional view taken along the line XVI-XVI in FIG. 15.

FIG. 15 is a perspective view of a printer. FIG. 16 is a sectional view taken along the line XVI-XVI in FIG. 15. Herein, in FIG. 15, the ejection roller 31 is omitted.

As shown in FIG. 15 and FIG. 16, a connection member 800 the configuration of which is basically similar to that of the connection member 8 according to Embodiment 1 is attached downward of the ejection tray 32 in the front cover 600. An accommodation portion 610 for accommodating a USB memory when the main frame side connector 87 is rocked to its retraction position is formed downward of the connection member 800.

In this connection, a state where the connection member 800 is located downward of the ejection tray 32 means a state where, as shown in FIG. 16, the main frame side connector 87 is located below the upper end portion 32*a* of the ejection tray 32.

An operation panel 3000 that is one example of the operation portion is provided on the upper side of the front cover 600 and at the A direction side of the printer 3 body.

Effects of the Present Embodiment

The main frame side connector 87 is provide at the same side as the operation panel 3000, that is, at the A direction side, and at the side to which recording sheets P are ejected. Therefore, it becomes easy for a user to operate the operation panel 3000, to connect the USB memory 1000 to the main frame side connector 87, and to take out recording sheets P from the ejection tray 32 in a state where the user is positioned at the A direction side. However, when the user operates the operation panel 3000 and takes out the recording sheets P in such a state, there is a possibility that a hand of the user is brought into contact with the USB memory 1000 protruded to the outside of the casing 2 and the main frame side connector 87 is damaged by a force resulting from the contact being transmitted thereto. However, in the present embodiment, since the main frame side connector 87 is displaced if it is subjected to such a force resulting from the hand of the user being brought into contact with the above-described USB memory 1000, it is possible to relieve the force that is given to the main frame side connector 87 by the contact. As a result, it is possible to prevent the mainframe side connector 87 from being subjected to damage.

Further, since the main frame side connector 87 is provided at the lower side of the ejection tray 32, it is possible to reduce the amount of upward protrusion of the printer 3. Therefore, it becomes easy for the size of the printer in its vertical direction. Here, since the main frame side connector 87 is provided at the lower side of the ejection tray 32, a possibility is further increased that a bundle of recording sheets dropped by mistake after having been taken out from the ejection tray 32 is brought into collision with the above-described USB memory 1000. However, in the present embodiment, since the main frame side connector 87 may be displaced if a force received by the bundle of recording sheets being brought into collision with the USB memory 1000 is transmitted to the main frame side connector 87, the force can be weakened, wherein it is possible to prevent the main frame side connector 87 from being subjected to damage.

Embodiment 5

Next, a description is given of Embodiment 5. Embodiment 5 differs from Embodiment 1 in abolition of the spring 83. Descriptions of the components that are similar to those of Embodiment 1 are omitted.

Figure 17:
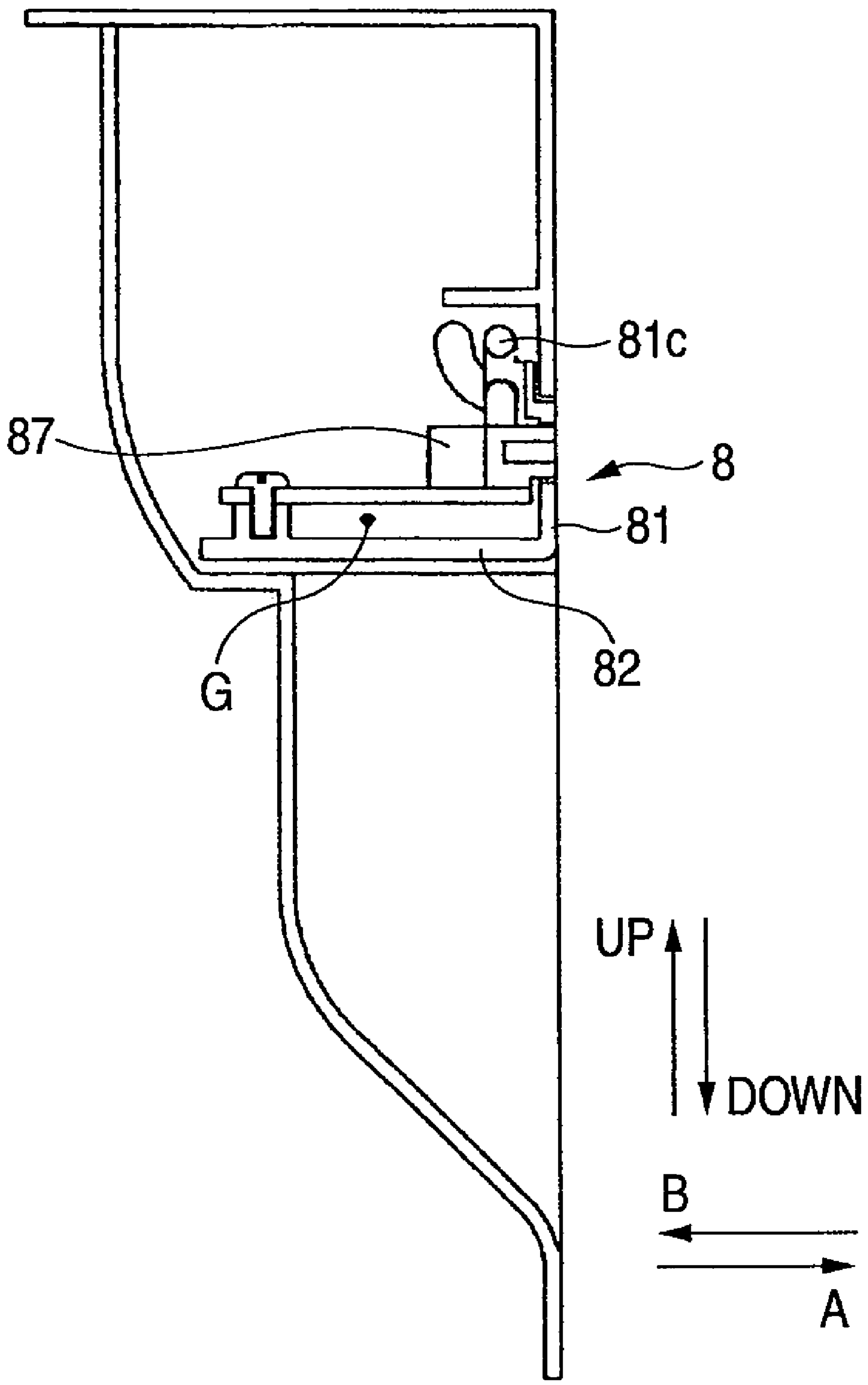
FIG. 17 is a view showing a state where the connection member is attached in the sectional view taken along the line V-V in FIG. 3.

FIG. 17 is a view showing a state where the connection member 8 is attached in the sectional view taken along the line V-V in FIG. 3.

The supporting member 80 is formed so that the center of gravity G of the supporting member 80 itself is positioned so as for the gravity to exert so that the main frame side connector 87 is caused to advance to the protrusion position.

In detail, as shown in FIG. 17, the supporting member 80 is formed so that the center of gravity of the connection member 8 is positioned from the rotating axis 81*c* to the B direction side, wherein the spring 83 is removed.

Also, since the connector substrate 85 is urged from the rotating axis 81*c* to the B direction side, the total gravity of the connection member 8 is positioned from the rotating axis 81*c* to the B direction side.

With such a configuration, even if the spring 83 is removed, it is possible that the main frame side connector 87 is caused to advance to the protrusion position, wherein the material costs can be reduced by removal of the spring 83.

Other Embodiments

Although, in Embodiment 1, the main frame side connector 87 is rockably supported, it may be supported so as to be movable in parallel.

Although, in Embodiment 2, a digital camera 2000 is listed as an external device, it may be a personal computer, and other memory devices.

In Embodiments 1 and 2, although the main frame side connector 87 is provided at the A direction side of the casing 2, it may be provided at other sides. For example, where the main frame side connector 87 is connected to an external device for a longer period of time, the main frame side connector 87 may be provided at the B direction side of the casing 2. The B direction side of the casing 2 is the opposite side of the operation panel 73, that is, the rear side thereof. There is a case where the apparatus is installed facing the wall of a building. If the main frame side connector 87 is thus provided, the amount of protrusion of the external device in the B direction side of the casing 2 can be reduced by displacing the external device to its retraction position. As a result, space can be effectively utilized by shortening the distance between the casing 2 and the wall of a building.

In Embodiment 1, although the main frame side connector 87 was a USB connector, it may be a transmission connector of any other system or may be a power supply connector.

The configurations of a plurality of embodiments described above may be combined.

In Embodiment 1, the printer 3 was a laser printer. However, may be an ink jet printer, a thermal printer, etc.

What is claimed is:

1. An image forming apparatus, comprising:

an image forming unit that forms an image on a recording sheet;

a casing that encloses the image forming unit and that has an ejection port configured to eject the recording sheet on which the image are formed;

an ejection tray that stacks recording sheets ejected from the ejection port;

a main frame side connector configured to electrically connect to an external device, the main frame side connector connectable to an external device side connector provided in the external device while at least a part of the external device is disposed outside the casing; and a supporting member that displaceably supports the main frame side connector with respect to the casing, the main frame side connector being supported by the supporting member so as to be rotatable with respect to the casing;

wherein the main frame side connector is displaceable between a protrusion position and a retraction position while being connected with the external side connector, the protrusion position where the at least a part of the external device protrudes from the main frame side connector to outside of the casing, the retraction position where a portion of the external device protruding outward from casing is retracted from the protrusion position towards a side of the main frame;

wherein the supporting member displaceably supports the main frame side connector in a vertical direction; and the supporting member has a center of gravity located at a position where gravity is applied so that the main frame side connector is faced to the protrusion position.

2. The image forming apparatus according to claim 1, further comprising:

an operation portion that is operable by a user;

wherein the ejection port ejects the recording sheet to a side where the operation portion is provided; and the main frame side connector is disposed at the same side as the operation portion and at a lower side of the ejection tray.

3. The image forming apparatus according to claim 1, wherein the external device integrally includes an external memory unit that is integrated with the external device side connector and that stores image data; and the casing includes a recess for accommodating the external memory unit so that the external memory unit does not protrude outward from the casing when the main frame side connector is displaced to the retraction position.

4. The image forming apparatus according to claim 1, wherein the supporting member includes an engagement member engageable with the casing when the main frame side connector is positioned at the retraction position.

5. The image forming apparatus according to claim 1, further including an urging portion that urges the main frame side connector to the protrusion position.

6. A multi-function device, comprising:

an image forming unit that forms an image on a recording sheet;

a casing that encloses the image forming unit and that has an ejection port configured to eject the recording sheet on which the image are formed;

an ejection tray that stacks recording sheets ejected from the ejection port;

a main frame side connector configured to electrically connect to an external device, the main frame side connector connectable to an external device side connector provided in the external device while at least a part of the external device is disposed outside the casing;

a supporting member that displaceably supports the main frame side connector with respect to the casing, the main frame side connector being supported by the supporting member so as to be rotatable with respect to the casing; and a scanning unit that scans an image formed on a document;

wherein the main frame side connector is displaceable between a protrusion position and a retraction position while being connected with the external side connector, the protrusion position where the at least a part of the external device protrudes from the main frame side connector to outside of the casing, the retraction position where a portion of the external device protruding outward from casing is retracted from the protrusion position towards a side of the main frame;

wherein the supporting member displaceably supports the main frame side connector in a vertical direction; and the supporting member has a center of gravity located at a position where gravity is applied so that the main frame side connector is faced to the protrusion position.

* * * * *